Figure 1:
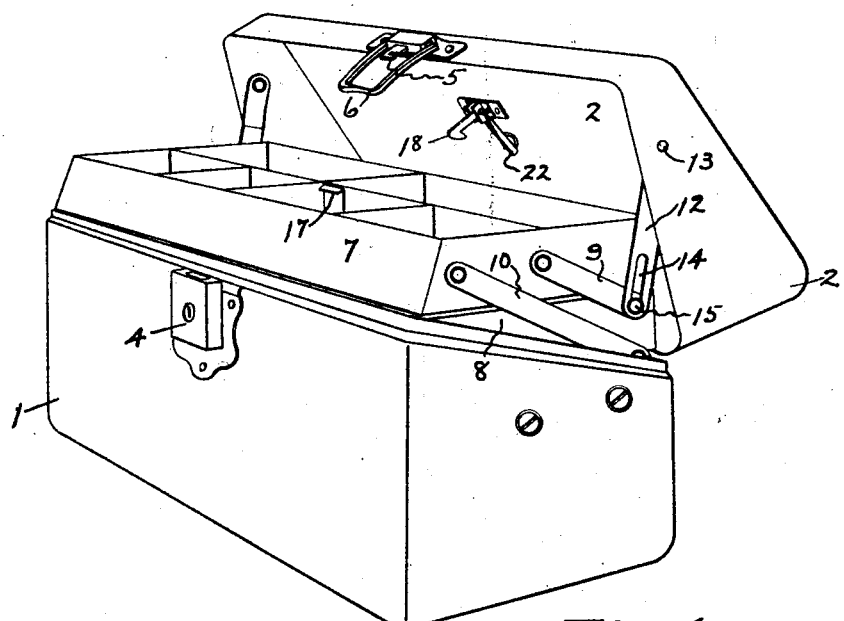

Oct. 18, 1932.  C. T. BOYNTON  1,882,756

TACKLE BOX

Filed March 20, 1930

Inventor
Charles T. Boynton
By Louis C. Vanderlip.
Attorney

UNITED STATES PATENT OFFICE

CHARLES T. BOYNTON, OF ELKHART, INDIANA, ASSIGNOR TO OUTING MANUFACTURING COMPANY, INC., OF ELKHART, INDIANA, A CORPORATION OF INDIANA

TACKLE BOX

Application filed March 20, 1930. Serial No. 437,541.

This invention relates to tackle boxes, particularly to fishing tackle boxes, and more especially to tackle boxes having a hinged cover.

A certain type of fishing tackle box having a hinged lid or cover is provided with a pair of trays which are normally arranged within the box and are adapted to be swung to the box exterior by linkage connecting said trays with the box cover, when the latter is swung to the fully open position.

The particular box referred to is illustrated in the accompanying drawing, and no claim is made to the construction of the box proper, or the trays therein, or the mechanism for operating the trays into and out of the box. While this box is provided with a key lock to lock the box cover in the closed position it is not a spring or automatic lock, and a hasp is resorted to to latch the box cover when the latter is closed to obviate casual opening of the cover when the box is being carried or lifted by the handle.

When this type of tackle box is not locked and the hasp is disengaged from the lock body, and an attempt is made to lift the box by the handle, the box body swings downward, thereby causing outward actuation of the trays and a spilling of the tray contents therefrom.

The principal object of this invention is to provide a latch mechanism between the box lid and one of the trays, in a box of the character described, to obviate inadvertent spilling of the contents of the box trays.

Other and more specific objects of the invention are mentioned and described herein, or suggested by the details of the drawing.

Figure 2:
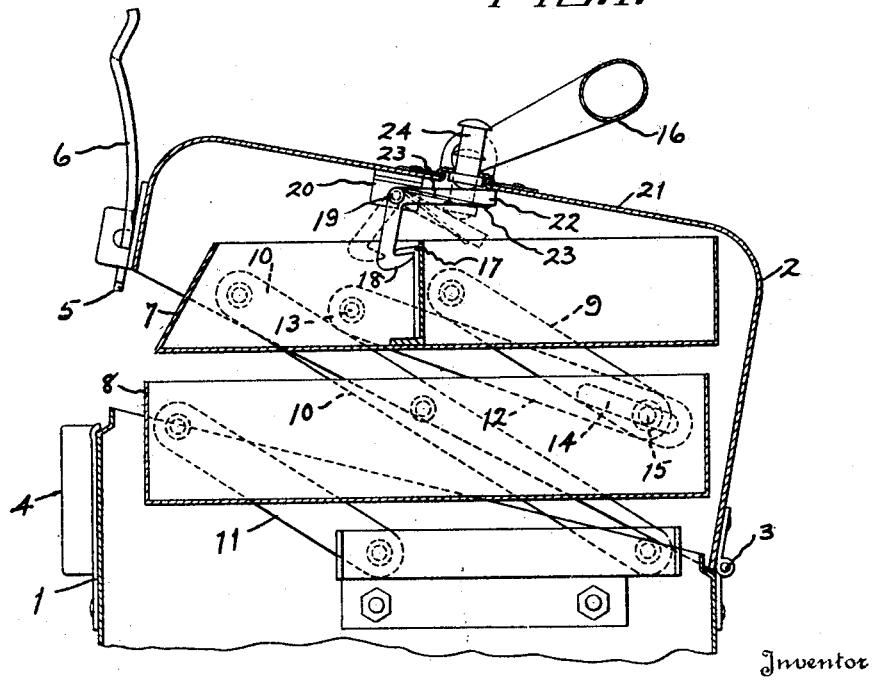

The preferred embodiment of my invention is illustrated in the accompanying drawing, wherein Figure 1 is a perspective view of a fishing tackle box, having automatically removable trays therein, to which my invention is applied; and Figure 2 is a fragmental transverse section taken through the box and lid and through the lock and latch mechanism of the invention.

Similar numerals of reference refer to like parts throughout the several views on the drawing.

Referring to the details of the drawing the numeral 1 indicates a sheet metal fishing tackle box provided with a lid or cover 2 which is hinged thereto at 3 in the box rear wall. A key lock 4 is secured to the box front wall and is adapted to be engaged by the usual hook 5 mounted on the front of the cover 2 and registerable with the usual opening in said lock, said hook being lockable in said lock only by the use of the usual key which actuates the lock bolt into engagement with said hook. A swinging loop-like hasp 6 is also mounted on the front of the box cover 2 adjacent the hook 5 and is adapted to be hooked or looped about the exterior of the lock casing for temporarily and quickly disengageably securing the lid 2 in the closed position.

The numerals 7 and 8 indicate a pair of superimposed trays arranged within the box and movably mounted upon the links 9, 10 and 11 which are suitably pivoted in the tray ends and in the box ends at both ends of each. A pair of actuating links 12 are pivoted in the box lid at 13 and provided with a longitudinal slot 14 which is in slidable engagement with the headed pivot pin 15 upon which the lower end of link 9 is pivotally mounted. As is well known in this box art, the opening of the box lid 2 actuates the trays 7 and 8 out of the box into a horizontal position exteriorly thereof, and renders the contents of both trays readily accessible; and the closing of the box lid automatically returns both trays to the box interior. But outward movement of the trays 7 and 8, when the box lid 2 is opened or elevated, does not begin until the lower end wall of the link slot 14 engages the pin 15. And until such an engagement occurs the trays remain stationary and immovable.

A handle 16 may be hingedly connected with the exterior of the box lid 2, whereby, when the lid is closed and locked, or secured by the hasp 6, as described, the box may be readily lifted or carried without spilling the contents of the trays therein. The numeral 17 indicates a hook-like catch element rigid with a portion of the top tray 7 and adapted to be engaged by a hook-like latch element 18 when the lid 2 is closed. The latch 18 is pivotally mounted on a hinge pin 19 which is carried in a bracket 20 rigidly secured to the inside surface of the top wall 21 of the lid 2, said latch depending from said bracket and having an angular arm 22 which is normally yieldingly pressed against the lower end of a push-button or pin 24 by a wire spring 23. The push-pin 24 is mounted in a suitable aperture in the lid wall 21 and projects to the lid exterior, the lower end thereof being in constant contact with the latch arm 22, whereby depression, or inward actuation of said push-pin tilts the latch arm 22, thereby disengaging latch hook 18 from the catch 17. When lid 2 is swung shut the beveled point of the latch 18 causes automatic engagement thereof with the catch 17, and when the box is lifted by the handle 16, with that condition existing, there is only a partial separation of box lid 2 and box body, as shown in Fig. 2, for the lid cannot open wide enough to make the links 12 operative to move the trays by the linkage described.

It is therefore obvious that the contents of trays 7 and 8 cannot be dumped or spilled therefrom when my invention is applied to this type of tackle box, when the box is not locked or the lid secured in the closed position by the hasp 6. It is also evident that the push-pin 24 may be quickly depressed to release the latch 18 to open the box and to render the trays accessible.

I claim:

1. The combination with a box provided with a hinged cover, of a plurality of superimposed trays arranged within the box, pivotally mounted linkage means connecting the opposite ends of said trays with the box for supporting said trays within the box and for moving them from and into the box, tray actuating linkage pivotally and operatively connecting said box cover with said tray linkage and operative upon and by the opening movement of said box cover to actuate said trays from and to the box interior, and disengageable latch means for latching said box cover to one of said trays when the latter are positioned within the box, whereby, when said box cover is partially opened, and said trays are outwardly moved thereby, one of said trays is caused to engage and bind against said box cover, thereby preventing further outward movement of either said box cover or said trays.

2. The combination with a box provided with a hinged cover, of a plurality of superimposed trays arranged within the box, pivotally mounted linkage means connecting the opposite ends of said trays with each other and with said box for supporting said trays within the box and for moving them from and into the box, tray actuating linkage pivotally and operatively connecting said box cover with said tray linkage and operative upon and by the opening movement of said box cover to actuate said trays from and to the box interior, said linkage including a pin and slot connection, and disengageable latch means mounted upon said box cover for latching said box cover to one of said trays when the latter are positioned within the box, whereby, when said box cover is partially opened, and said trays are outwardly moved thereby, one of said trays is caused to engage and bind against said box cover, thereby blocking further outward movement of said box cover and the trays.

3. The combination with a box provided with a hinged cover, of a plurality of superimposed trays arranged within the box, pivotally mounted linkage means connecting the opposite ends of said trays with each other and with said box for supporting said trays within the box and for moving them from and into the box, tray actuating linkage pivotally and operatively connecting said box cover with said tray supporting linkage and operative and by the opening movement of said box cover to actuate said trays from and to the box interior, said linkage including a pin and slot connection, disengageable latch means mounted upon the under side of said box cover for latching said cover to one of said trays when the latter are positioned within the box, whereby, when said box cover is partially opened, and said trays are outwardly moved thereby, one of said trays is caused to engage and bind against said box cover, thereby blocking further outward movement of said box cover and the trays, and means for disengaging said latch from the box cover exterior.

CHARLES T. BOYNTON.